(12) United States Patent
Chae et al.

(10) Patent No.: US 12,542,270 B2
(45) Date of Patent: Feb. 3, 2026

(54) LITHIUM METAL PATTERNING AND ELECTROCHEMICAL DEVICE USING THE SAME

(71) Applicant: LG ENERGY SOLUTION, LTD., Seoul (KR)

(72) Inventors: Oh-Byong Chae, Daejeon (KR); Eun-Kyung Kim, Daejeon (KR); Sang-Wook Woo, Daejeon (KR); Geun-Sik Jo, Daejeon (KR); Soo-Hee Kang, Daejeon (KR); Hee-Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/637,250

(22) Filed: Apr. 16, 2024

(65) Prior Publication Data

US 2024/0266496 A1 Aug. 8, 2024

Related U.S. Application Data

(63) Continuation of application No. 16/324,706, filed as application No. PCT/KR2017/015584 on Dec. 27, 2017, now Pat. No. 11,990,602.

(30) Foreign Application Priority Data

Jan. 9, 2017 (KR) .......................... 10-2017-0002755

(51) Int. Cl.
*H01M 4/38* (2006.01)
*C22C 24/00* (2006.01)
(Continued)

(52) U.S. Cl.
CPC ........... *H01M 4/0485* (2013.01); *C22C 24/00* (2013.01); *C22F 1/16* (2013.01); *H01M 4/02* (2013.01);
(Continued)

(58) Field of Classification Search
CPC ........... H01M 2004/027; H01M 4/043; H01M 4/0433; H01M 4/0485; H01M 4/134; H01M 4/382; H01M 10/052
See application file for complete search history.

(56) References Cited

U.S. PATENT DOCUMENTS

| | | | |
|---|---|---|---|
| 5,718,789 A | 2/1998 | Gebhardt et al. | |
| 6,399,253 B1 | 6/2002 | Chang et al. | |

(Continued)

FOREIGN PATENT DOCUMENTS

| | | |
|---|---|---|
| CN | 1427490 A | 7/2003 |
| CN | 102449811 A | 5/2012 |

(Continued)

OTHER PUBLICATIONS

Extended European Search Report for European Application No. 17889922.5, dated May 22, 2019.
(Continued)

*Primary Examiner* — Brittany L Raymond
(74) *Attorney, Agent, or Firm* — Birch, Stewart, Kolasch & Birch, LLP

(57) ABSTRACT

A lithium metal is physically pressed to a silicon wafer having a uniform intaglio or embossed pattern formed thereon in advance, or liquid lithium is applied to the silicon wafer and may then be cooled in order to form a uniform pattern on the surface of the lithium metal.

14 Claims, 3 Drawing Sheets

(51) Int. Cl.

| | |
|---|---|
| *C22F 1/16* | (2006.01) |
| *H01M 4/02* | (2006.01) |
| *H01M 4/04* | (2006.01) |
| *H01M 4/08* | (2006.01) |
| *H01M 4/134* | (2010.01) |
| *H01M 4/139* | (2010.01) |
| *H01M 4/1395* | (2010.01) |
| *H01M 10/052* | (2010.01) |

(52) U.S. Cl.
CPC .............. *H01M 4/043* (2013.01); *H01M 4/08* (2013.01); *H01M 4/134* (2013.01); *H01M 4/139* (2013.01); *H01M 4/1395* (2013.01); *H01M 4/382* (2013.01); *H01M 10/052* (2013.01); *H01M 2004/021* (2013.01); *H01M 2004/027* (2013.01); *H01M 2220/30* (2013.01)

(56) References Cited

U.S. PATENT DOCUMENTS

| | | | |
|---|---|---|---|
| 9,203,078 B2 | 12/2015 | Ishikawa et al. | |
| 9,780,359 B2 | 10/2017 | Kim et al. | |
| 2002/0119373 A1 | 8/2002 | Gao et al. | |
| 2008/0248386 A1* | 10/2008 | Obrovac | H01M 10/052 205/50 |
| 2008/0248388 A1 | 10/2008 | Obrovac et al. | |
| 2012/0070742 A1 | 3/2012 | Chung et al. | |
| 2012/0121983 A1 | 5/2012 | Yoon et al. | |
| 2013/0003261 A1 | 1/2013 | Remizov et al. | |
| 2013/0252068 A1 | 9/2013 | Lee et al. | |
| 2013/0295453 A1 | 11/2013 | Ishikawa et al. | |
| 2014/0349170 A1 | 11/2014 | Kim et al. | |
| 2017/0062815 A1 | 3/2017 | Zhong | |

FOREIGN PATENT DOCUMENTS

| | | |
|---|---|---|
| CN | 103840138 A | 6/2014 |
| CN | 204118183 U | 1/2015 |
| CN | 105762326 A | 7/2016 |
| JP | 2005-108521 A | 4/2005 |
| JP | 2013-198956 A | 9/2013 |
| KR | 10-0582557 B1 | 5/2006 |
| KR | 10-2008-0036261 A | 4/2008 |
| KR | 10-0824048 B1 | 4/2008 |
| KR | 10-2012-0053180 A | 5/2012 |
| KR | 10-2013-0108881 A | 9/2013 |
| KR | 10-2013-0111992 A | 10/2013 |
| KR | 10-2013-0116828 A | 10/2013 |
| KR | 10-2013-0117930 A | 10/2013 |
| KR | 10-2014-0089781 A | 6/2014 |
| KR | 10-2015-0000984 A | 1/2015 |

OTHER PUBLICATIONS

International Search Report (PCT/ISA/210) issued in PCT/KR2017/015584, mailed on May 8, 2018.

Ryou et al., "Mechanical Surface Modification of Lithium Metal: Towards Improved Li Metal Anode Performance by Directed Li Plating", Advanced Functional Materials, 2015, vol. 25, No. 6, pp. 834-841.

* cited by examiner

[FIG. 1]
(a)
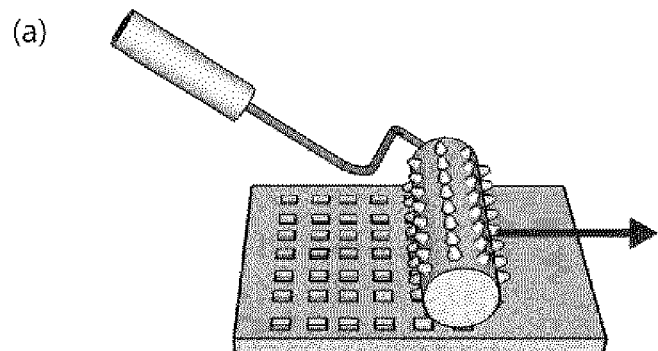
(b)
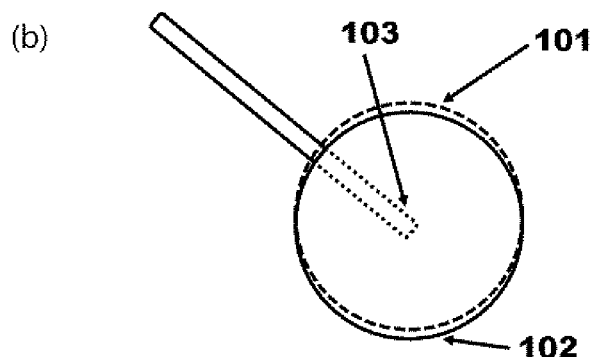
[FIG. 2]
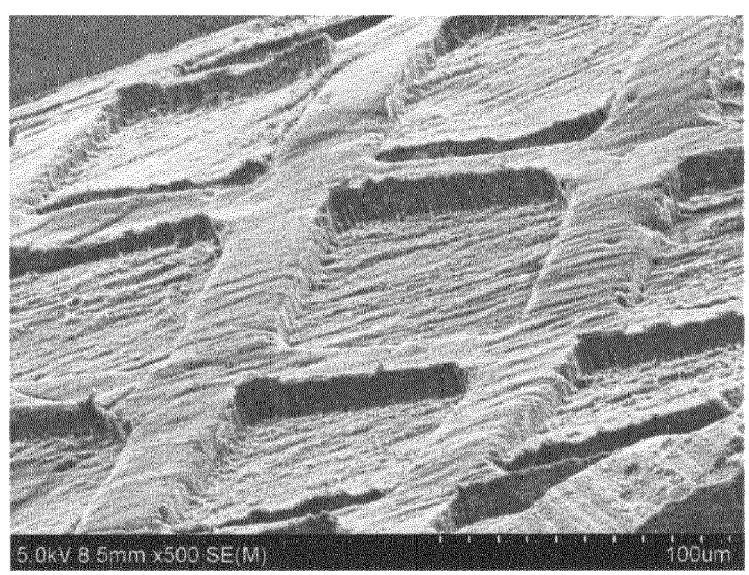

[FIG. 3]
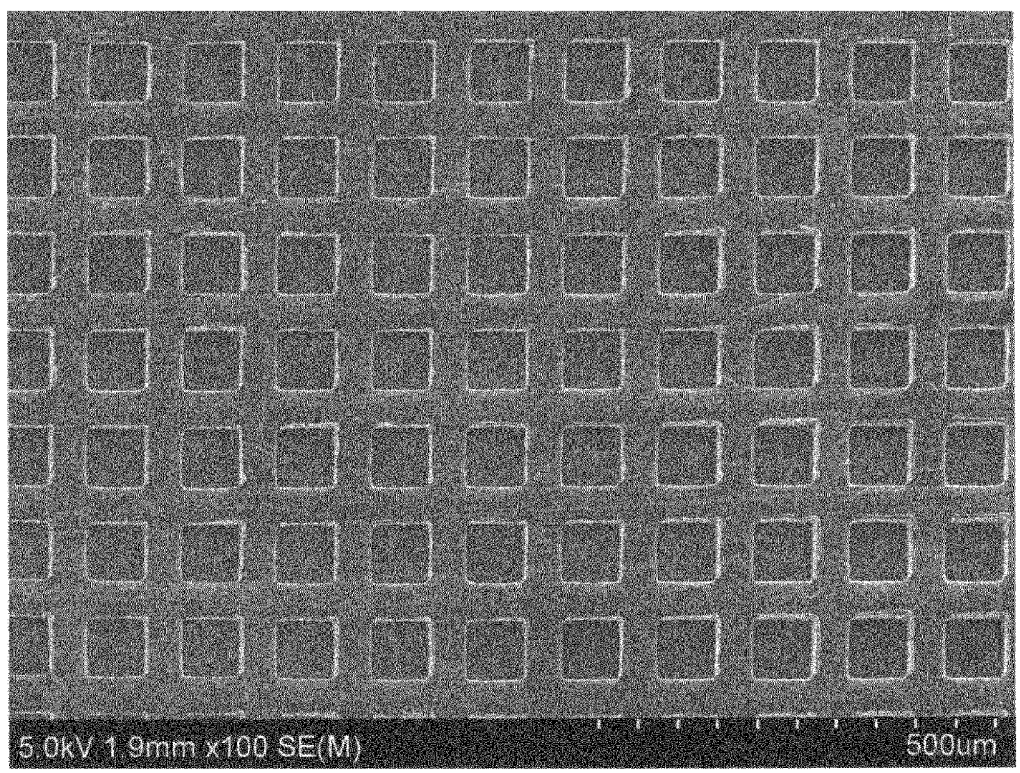
[FIG. 4]
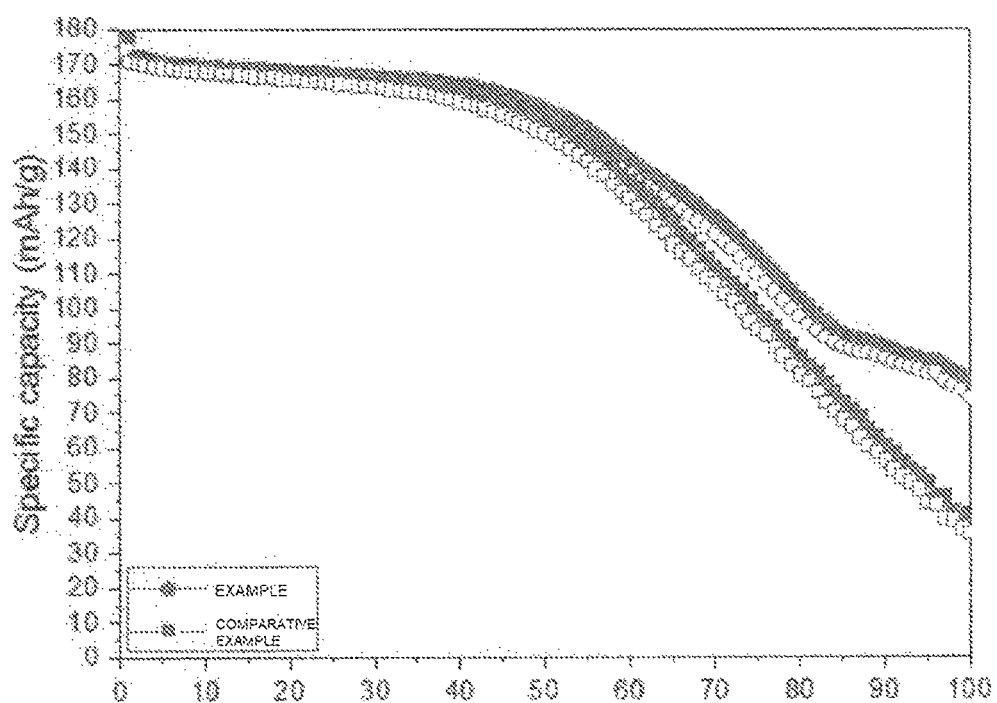

【FIG. 5】
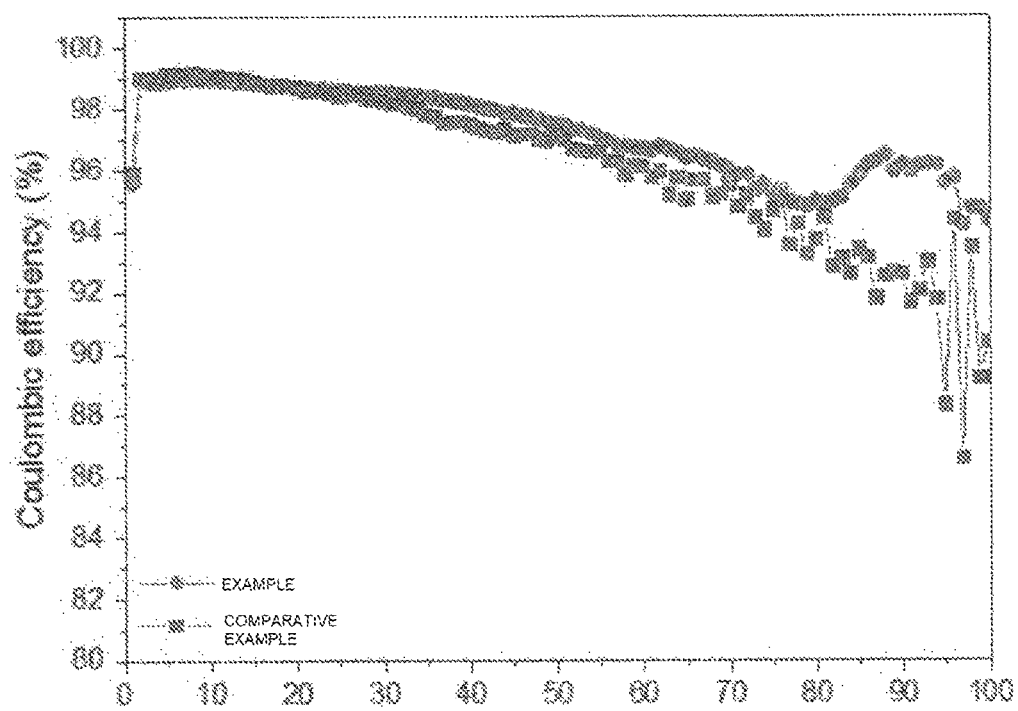

LITHIUM METAL PATTERNING AND ELECTROCHEMICAL DEVICE USING THE SAME

CROSS-REFERENCE TO RELATED APPLICATIONS

This application is a Continuation application of co-pending application Ser. No. 16/324,706, filed on Feb. 11, 2019, which is the National Phase under 35 U.S.C. § 371 of International Application No. PCT/KR2017/015584, filed on Dec. 27, 2017, which claims the benefit under 35 U.S.C. § 119 (a) to Patent Application No. 10-2017-0002755, filed in Republic of Korea on Jan. 9, 2017, all of which are hereby expressly incorporated by reference into the present application.

TECHNICAL FIELD

The present invention relates to a negative electrode of a lithium metal secondary battery and a method of manufacturing the same, and more particularly to a method of forming a micro pattern on a lithium metal, which is used as a negative electrode of a lithium metal secondary battery, a micro-patterned lithium metal manufactured by the same, and a negative electrode and a lithium metal secondary battery using the same.

BACKGROUND ART

With the recent weight reduction and performance improvement of portable devices, such as smartphones, laptop computers, tablet PCs, and portable game consoles, the demand for secondary batteries used as driving sources thereof has been changed. In the past, a nickel-cadmium battery, a nickel-hydride battery, and a nickel-zinc battery were used. At present, a lithium secondary battery, which has high operating voltage and high energy density per unit weight, is being used in the greatest numbers.

A material that reversibly stores and releases lithium ion to exhibit high reversible potential, such as $LiCoO_2$, $LiNiO_2$, or $LiMn_2O_4$, is used as the material of a positive electrode of a lithium secondary battery. The positive electrode material is still under development in order to improve the performance and stability of the lithium secondary battery.

A lithium metal, which has highest energy density per unit weight and a standard hydrogen potential of −3.04V, which is the lowest, is most ideally used as the material of a negative electrode of the lithium secondary battery. In the case in which a lithium metal is used as the material of the negative electrode of the lithium secondary battery, it is theoretically possible to obtain a capacity of 3860 $mAhg^{-1}$, which is 10 times or more of the capacities of current commercial batteries. In this case, however, dendrite may easily grow on the surface of the lithium metal, and such dendrite may damage a separator of the battery, whereby the performance and safety of the battery may be reduced. In addition, the precipitated dendrite may abruptly increase the specific surface area and reactivity of the lithium metal, whereby a polymer film having no electrical conductivity may be formed after reaction with an electrolytic solution. Rapid charging, which has been rising in popularity in recent years, makes this effect worse.

In order to solve this problem, a carbon material, such as graphite or carbon, which is usable for a long time, has been mainly used as the negative electrode material. In the case in which the lithium metal is directly used as the negative electrode material, the maximum possible number of charge and discharge cycles is only several tens, which is insufficient for practical application. For this reason, a material that can be used for a long time even though the one-time capacity thereof is small, such as graphite or carbon, has been mainly used. Since the lithium metal is not precipitated, an internal short circuit or additional problems due to dendrite do not occur, whereby stable use for a long time becomes possible. A theoretical lithium storage capacity of the negative electrode material, such as graphite or carbon, is 372 $mAhg^{-1}$, which is equivalent to 10% of that of the lithium metal. Although much effort has been made in order to increase the lithium storage capacity, therefore, it has not greatly exceeded theoretical limitations.

Various attempts to improve the lithium metal to a level sufficient for practical use as a negative electrode material have been made in order to support the performance improvement of portable devices. Many attempts to increase the surface area of the lithium metal for use as a negative electrode material have been made. Non-Patent Document 1 discloses a change in performance due to mechanical surface treatment of a lithium metal foil electrode. FIG. 1 shows a method of treating the surface of a lithium metal using micro needles. Treatment of the surface of the lithium metal using micro needles is an economical and effective method, in which a wide surface area can be treated by simple rolling, charging and discharging and cycle characteristics can be improved, interface resistance can be reduced, and precipitation of lithium on the surface of an electrode can be restrained. Since a roller having the micro needles formed thereon is continuously rotated, however, it is very important to shape the roller. If an axis 103 of the roller is not located at the center of the roller, as shown in FIG. 1(b), the roller may be rotated such that the sectional area of the roller has an oval shape 101, rather than a completely circular shaper 102. As a result, the surface of the lithium metal may not be uniformly treated. Such non-uniformity may occur even when the micro needles formed on the surface of the roller are not uniform. Considering that the surface treatment using the micro needles is performed in micrometer units, such non-uniformity of the surface directly results in a reduction in the lifespan and performance of the battery. In addition, since the roller is smaller than a general lithium metal foil, it is difficult to treat the large-area lithium metal foil at once. Consequently, it is necessary to rotate the roller several times for each foil, whereby the surface treatment may be non-uniformly performed. Such treatment non-uniformity may not be serious for a small-area foil, but may be serious in the case in which commercial products are produced in large quantities.

Patent Document 1 discloses a method of manufacturing an electrode for secondary batteries, in which the surface of a current collector is treated in order to have morphology in which a surface roughness Ra of 0.001 to 10 µm is formed over the entire surface of the current collector. The current collector is rolled by a roller having a pattern formed on the surface thereof. As a result, the force of adhesion between an electrode active material and the current collector is increased.

Patent Document 2 discloses a negative electrode for lithium secondary batteries including a silicon current collector having concave and convex portions formed thereon and lithium, as a negative electrode active material, formed on the convex portions of the silicon current collector by electro deposition. In order to manufacture the negative electrode, concave and convex portions are formed on a silicon substrate, and the silicon substrate having the concave and convex portions formed thereon is plated with metal, or is doped with a dopant and is electrically plated with lithium.

Patent Document 3 discloses a negative electrode having a conductive polymer coated thereon in a uniform pattern and a secondary battery including the same. A mixture including a conductive polymer is applied to the surface of a current collector, made of a metal such as copper, in the state in which a release paper having a pattern formed thereon is attached to the surface of the current collector, and the mixture is dried. Subsequently, the release paper is removed, whereby the conductive polymer is applied only to the portion of the current collector having no pattern. In this state, a negative electrode material, including a negative electrode active material, a binder, and a conductive agent, is applied to the current collector in order to manufacture a negative electrode.

Patent Document 4 discloses a negative electrode for secondary batteries configured such that a negative electrode material, including a negative electrode active material, a binder, and a conductive agent, is applied to a current collector. The negative electrode material is applied to the current collector in a three-dimensional pattern. The three-dimensional pattern may be formed using a general method, such as spray coating, pattern coating, deposition, or etching.

[Patent Document 001] Korean Patent Application Publication No. 10-2013-0116828
[Patent Document 002] Korean Patent Application Publication No. 10-2012-0053180
[Patent Document 003] Korean Patent Application Publication No. 10-2008-0036261
[Patent Document 004] Korean Patent Application Publication No. 10-2013-0117930
[Non-Patent Document 001] Myung-Hyun Ryou et al. "Mechanical Surface Modification of Lithium Metal: Towards Improved Li Metal Anode Performance by Directed Li Plating", Adv. Funct. Mater. 25, 834-841 (2015)

DISCLOSURE

Technical Problem

An object of the present invention is to provide a method of improving the performance of a lithium metal used as a negative electrode material. Another object of the present invention is to improve the reversibility of a lithium metal by patterning the surface of the lithium metal. A further object of the present invention is to provide a method of uniformly patterning a larger area of a lithium metal than a conventional patterning method and a method of easily manufacturing a plurality of patterned lithium metals at once.

Technical Solution

In accordance with a first aspect of the present invention, the above and other objects can be accomplished by the provision of a method of patterning the surface of a lithium metal, the method including the following steps.

1) a step of forming a uniform intaglio or embossed pattern having a size of 0.001 to 900 $\mu m$ on a silicon wafer,
2) a step of physically pressing a lithium metal to the silicon wafer having the uniform pattern formed thereon or applying liquid lithium to the silicon wafer and cooling the liquid lithium in order to form a uniform pattern on the surface of the lithium metal, and 3) a step of separating the lithium metal having the uniform pattern formed thereon from the silicon wafer.

In accordance with a second aspect of the present invention, the horizontal shape of the uniform pattern may be polygonal, circular, or oval.

In accordance with a third aspect of the present invention, the vertical sectional shape of the uniform pattern may be polygonal, circular, oval, or slit-shaped.

In accordance with a fourth aspect of the present invention, the height or depth of the uniform pattern may be 1/100 to 10 times the size of the uniform pattern.

In accordance with a fifth aspect of the present invention, there is provided a patterned lithium metal manufactured using the method described above.

In accordance with a sixth aspect of the present invention, there is provided an electrode for a secondary battery including the patterned lithium metal.

In accordance with a seventh aspect of the present invention, there is provided a lithium metal secondary battery including the electrode for a secondary battery.

BRIEF DESCRIPTION OF DRAWINGS

FIG. 1 is a view showing an example of a conventional method of treating the surface of a lithium metal using micro needles (a) and illustrating a cause by which non-uniform pressure is generated in the case in which the micro needles are used (b);

FIG. 2 is an electron microscope photograph showing a patterned lithium metal according to the present invention;

FIG. 3 is another electron microscope photograph showing a patterned lithium metal according to the present invention;

FIG. 4 is a graph showing a charging capacity and a discharging capacity measured during charging and discharging processes according to an Example and a Comparative Example; and FIG. 5 is a graph showing charging and discharging efficiencies during the charging and discharging processes according to the Example and the Comparative Example.

BEST MODE

In the present application, it should be understood that the terms "comprises," "has," or "includes," etc. specify the presence of features, integers, steps, operations, components, parts, or combinations thereof described in the specification, but do not preclude the presence or addition of one or more other features, integers, steps, operations, components, parts, or combinations thereof.

It should be understood that when a component is referred to as being "connected to" or "coupled to" another component, it may be directly connected to or coupled to another component, or intervening components may be present therebetween. In contrast, it should be understood that when a component is referred to as being "directly connected to" or "directly coupled to" another component, there are no intervening components present. Other terms that describe the relationship between components, such as "between" and "directly between" or "adjacent to" and "directly adjacent to," are to be interpreted in the same manner.

In addition, all terms including technical or scientific terms have the same meanings as those generally understood by a person having ordinary skill in the art to which the present invention pertains, unless defined otherwise. Generally used terms, such as terms defined in a dictionary, should be interpreted as coinciding with the meanings of the related art from the context. Unless obviously defined in the present application, such terms are not to be interpreted as having ideal or excessively formal meanings.

The present invention provides a method of patterning the surface of a lithium metal including the following steps.

1) a step of forming a uniform intaglio or embossed pattern having a size of 0.001 to 900 µm on a silicon wafer, 2) physically pressing a lithium metal to the silicon wafer having the uniform intaglio or embossed pattern formed thereon or applying liquid lithium to the silicon wafer and cooling the liquid lithium in order to form a uniform intaglio or embossed pattern on the surface of the lithium metal, and 3) separating the lithium metal having the uniform intaglio or embossed pattern formed thereon from the silicon wafer.

Step 1), i.e. the step of forming the uniform intaglio or embossed pattern on the silicon wafer, may be achieved by etching in a conventional semiconductor process, and therefore a detailed description thereof will be omitted.

At step 2), a lithium metal foil is placed on the silicon wafer having the intaglio or embossed pattern formed thereon, and uniform physical pressure is applied to the lithium metal foil using a press having a large area. At this time, the physical pressure may be changed depending on the thickness of the lithium metal foil and the height of the intaglio or embossed pattern of the silicon wafer. After the physical pressure is removed, the lithium metal foil is separated from the silicon wafer, whereby a patterned lithium metal is finally obtained.

Various patterns may be formed on the silicon wafer. A pattern having a larger area may be formed than in the case of using conventional roller-shaped micro needles. The most basic pattern may include quadrangles or hexagons (honeycomb shapes) that are repeatedly arranged. In addition, polygons, such as triangles, circles or ovals, or various geometrical lattice patterns may be formed.

In general, the vertical surface of the pattern may be rectangular. In addition, a polygonal shape, a circular shape, an oval shape, or a slit shape may be used. The height or depth of the pattern may be 1/100 to 10 times, preferably 1/50 to 1/10 times, the size of the pattern.

It is possible to manufacture a secondary battery using the patterned lithium metal according to the present invention as a negative electrode. Here, the materials that are generally used for a lithium secondary battery may be used as a current collector, a positive electrode, a separator, and an electrolytic solution, which correspond to the negative electrode.

EXAMPLE

Hereinafter, the present invention will be described in detail with reference to the following Example and Experimental Examples; however, the present invention is not limited by the Example and the Experimental Examples. The Example may be modified into various other forms, and the scope of the present invention should not be interpreted as being limited by the Example, which will be described in detail. The Example is provided in order to more completely explain the prevent invention to a person who has average knowledge in the art to which the present invention pertains.
<Lithium Metal Patterning>

A lithium metal (having a length of 150 µm and a width of 150 µm) was placed on a micro-patterned silicon wafer having a length of 100 µm, a width of 100 µm, and a height of 32 µm, and then uniform pressure was applied to the lithium metal. Subsequently, the pressed lithium metal was separated from the silicon wafer. In this way, a micro-patterned lithium metal foil having a length of 100 µm, a width of 100 µm, and a height of 32 µm was manufactured.
<Manufacture of a Lithium Secondary Battery>

96 weight % of $LiCoO_2$ as a positive electrode active material, 2 weight % of Denka black (a conductive agent), and 2 weight % of polyvinylidene fluoride (PVDF) (a binder) were added to N-methyl-2-pyrrolidone (NMP) in order to manufacture a positive electrode material slurry. The manufactured positive electrode material slurry was coated on one surface of an aluminum current collector such that the positive electrode material slurry had a thickness of 65 µm. The positive electrode material slurry was dried, and the aluminum current collector was rolled. Subsequently, the aluminum current collector was punched so as to have a predetermined size, whereby a positive electrode was manufactured.

The patterned lithium metal foil, manufactured as described above, was used as a counter electrode. A polyolefin-based separator was interposed between the positive electrode and the counter electrode, and an electrolytic solution, in which 1M LiPF6 was dissolved in a solvent obtained by mixing ethylene carbonate (EC) and ethyl methyl carbonate (EMC) at a volume ratio of 50:50, was injected into the electrode assembly in order to manufacture a coin-type half battery.
<Charging and Discharging>

The coin-type half battery, manufactured as described above, was charged and discharged using an electrochemical charging and discharging device. Charging was performed until the voltage of the coin-type half battery became 4.4 V vs. $Li/Li^+$, and discharging was performed until the voltage of the coin-type half battery became 3.0 V vs. $Li/Li^+$. At this time, the current density was 0.5 C-rate.

Comparative Example

A coin-type half battery was manufactured in the same manner as in the Example except that a non-patterned lithium metal foil was used as a counter electrode, in place of the patterned lithium metal foil according to the Example, and the coin-type half battery was charged and discharged under the same conditions as in charging and discharging according to the Example.

Experimental Example 1: Observation of the Shape of the Surface of a Lithium Metal An electron microscope (SEM) photograph of the patterned lithium metal manufactured according to the Example is shown in FIG. 1 and FIG. 2. It can be seen that a micro pattern having a distance between respective lattices of 100 µm is uniformly formed.

Experimental Example 2: Comparison in Electrochemical Charging and Discharging Performance A charging capacity and a discharging capacity were measured during charging and discharging processes according to the Example and the Comparative Example. The results are shown in FIG. 4. The charging and discharging efficiencies at that time are shown in FIG. 5.

Referring to FIG. 4, the cycle performance of the Example and the cycle performance of the Comparative Example are similar to each other in the early cycles; however, the cycle performance of the Example and the cycle performance of the Comparative Example are very different from each other after 50 cycles. It can be seen that the Example exhibits better performance than the Comparative Example and that the difference in the performance between the Example and the Comparative Example becomes greater as the number of cycles is increased.

Referring to FIG. 5, it can be seen that the Example exhibits higher charging and discharging efficiency than the Comparative Example even in the early cycles.

As described above, it can be seen that, in the case in which the patterned lithium metal is used, it is possible to remarkably improve charging and discharging capacity and efficiency of the battery.

The patterned lithium metal has a wider surface area than an untreated lithium metal. Since the current density of the Example is lower than the current density of the Comparative Example even when charging and discharging are performed at the same current density, more stable charging and discharging can be performed in the Example than in the Comparative Example.

A lithium metal secondary battery is charged and discharged as lithium is deposited to and is separated from the surface of a lithium metal. If the lithium metal secondary battery is charged and discharged at high current density, the lithium metal grows abnormally. Separation of lithium from such a portion of the lithium metal reduces the reversibility of a cell, and seriously affects the safety of the cell.

The present invention has an effect in that the patterned lithium metal has an increased surface area, whereby the current density of the lithium metal is reduced and thus it is possible to restrain abnormal growth of the lithium metal. Due to these characteristics, the overall performance of the battery is improved, which becomes increasingly notable as the number of cycles is increased.

The present invention has other effects in that the patterned lithium metal can be manufactured so as to have a wider area and to be more uniform than by conventional patterning using micro needles, in that a difference in pressure due to rolling does not occur, and in that large-area patterning is possible, whereby the present invention is applicable to an actual commercial process.

INDUSTRIAL APPLICABILITY

As is apparent from the above description, according to the present invention, a lithium metal may be physically pressed to a silicon wafer having a uniform intaglio or embossed pattern formed thereon in advance, or liquid lithium may be applied to the silicon wafer and may then be cooled in order to form a uniform pattern on the surface of the lithium metal, whereby it is possible to manufacture a large number of patterned lithium metal foils at once. In addition, it is possible to perform patterning so as to have various shapes or to have a large area, and it is possible to minimize the formation of a non-uniform pattern due to a difference in pressing pressure. The patterned lithium metal exhibits higher reversibility than a conventional lithium metal, whereby the lifespan of a battery may be greatly increased.

The invention claimed is:

1. An electrode for a secondary battery comprising a patterned lithium metal comprising:
a uniform pattern comprising a plurality of recessed portions on a surface of a lithium metal, the plurality of recessed portions being arranged uniformly in a first direction on the surface of the lithium metal and uniformly in a second direction orthogonal to the first direction on the surface of the lithium metal,
wherein the uniform pattern is an intaglio or embossed pattern into the surface of the lithium metal and the plurality of recessed portions have a size of 0.001 μm to 900 μm on the lithium metal and the size is a length or a width, and a depth of the plurality of recessed portions is in a range of more than 0 μm to 20 μm or less, and
wherein the electrode is a current collector free electrode.

2. The electrode according to claim 1, wherein the size of the plurality of recessed portions is 100 μm to 900 μm on the lithium metal.

3. The electrode according to claim 1, wherein the size of the plurality of recessed portions is 100 μm to 400 μm on the lithium metal.

4. The electrode according to claim 1, wherein the uniform pattern is formed by physically pressing the lithium metal to a silicon wafer having the uniform intaglio or embossed pattern formed thereon or applying liquid lithium to the silicon wafer and cooling the liquid lithium.

5. The electrode according to claim 1, wherein a distance between adjacent recessed portions of the plurality of recessed portions in the uniform pattern is from 20 μm to 100 μm.

6. The electrode according to claim 1, wherein a horizontal shape of the uniform intaglio or embossed pattern is polygonal, circular, or oval, and a vertical sectional shape of the uniform intaglio or embossed pattern is polygonal, circular, oval, or slit-shaped.

7. The electrode according to claim 1, wherein the electrode is a negative electrode.

8. The electrode according to claim 1, wherein a cross-sectional area at a surface of the intaglio or the embossed pattern is equal to a cross-sectional area of the intaglio or embossed pattern.

9. The electrode according to claim 1, wherein a cross-sectional area of the intaglio or the embossed pattern at the surface of the lithium metal is equal to a cross-sectional area of the intaglio or embossed pattern at a location recessed from the surface.

10. A secondary battery comprising an electrode according to claim 1.

11. The secondary battery according to claim 10, wherein the electrode is a negative electrode, and wherein the secondary battery is a lithium metal secondary battery.

12. An electrode for a secondary battery comprising a uniform patterned lithium metal comprising:
a uniform pattern comprising a plurality of recessed portions on a surface of a lithium metal, the plurality of recessed portions being arranged uniformly in a first direction on the surface of the lithium metal and uniformly in a second direction orthogonal to the first direction on the surface of the lithium metal,
wherein a distance between patterns in the uniform pattern is from 20 μm to 100 μm,
wherein the uniform pattern is an intaglio or embossed pattern into the surface of the lithium metal and the plurality of recessed portions have a size of 100 μm to 400 μm on the lithium metal and the size is a length or a width, and a depth of the plurality of recessed portions is in a range of more than 0 μm to 20 μm or less,
wherein a horizontal shape of the uniform intaglio or embossed pattern is polygonal, circular, or oval, and a vertical sectional shape of the uniform intaglio or embossed pattern is polygonal, circular, oval, or slit-shaped, and
wherein the electrode is a current collector free electrode.

13. The uniform patterned lithium metal according to claim 12, wherein a cross-sectional area at a surface of the intaglio or the embossed pattern is equal to a cross-sectional area of the intaglio or embossed pattern.

14. The uniform patterned lithium metal according to claim 12, wherein a cross-sectional area of the intaglio or the embossed pattern at the surface of the lithium metal is equal to a cross-sectional area of the intaglio or embossed pattern at a location recessed from the surface.

\* \* \* \* \*